Oct. 22, 1957 A. A. ROGERS 2,810,526
PROPORTIONING ON AND OFF CONTROLLING SYSTEM FOR VARIABLES
Filed Oct. 14, 1952 2 Sheets-Sheet 1
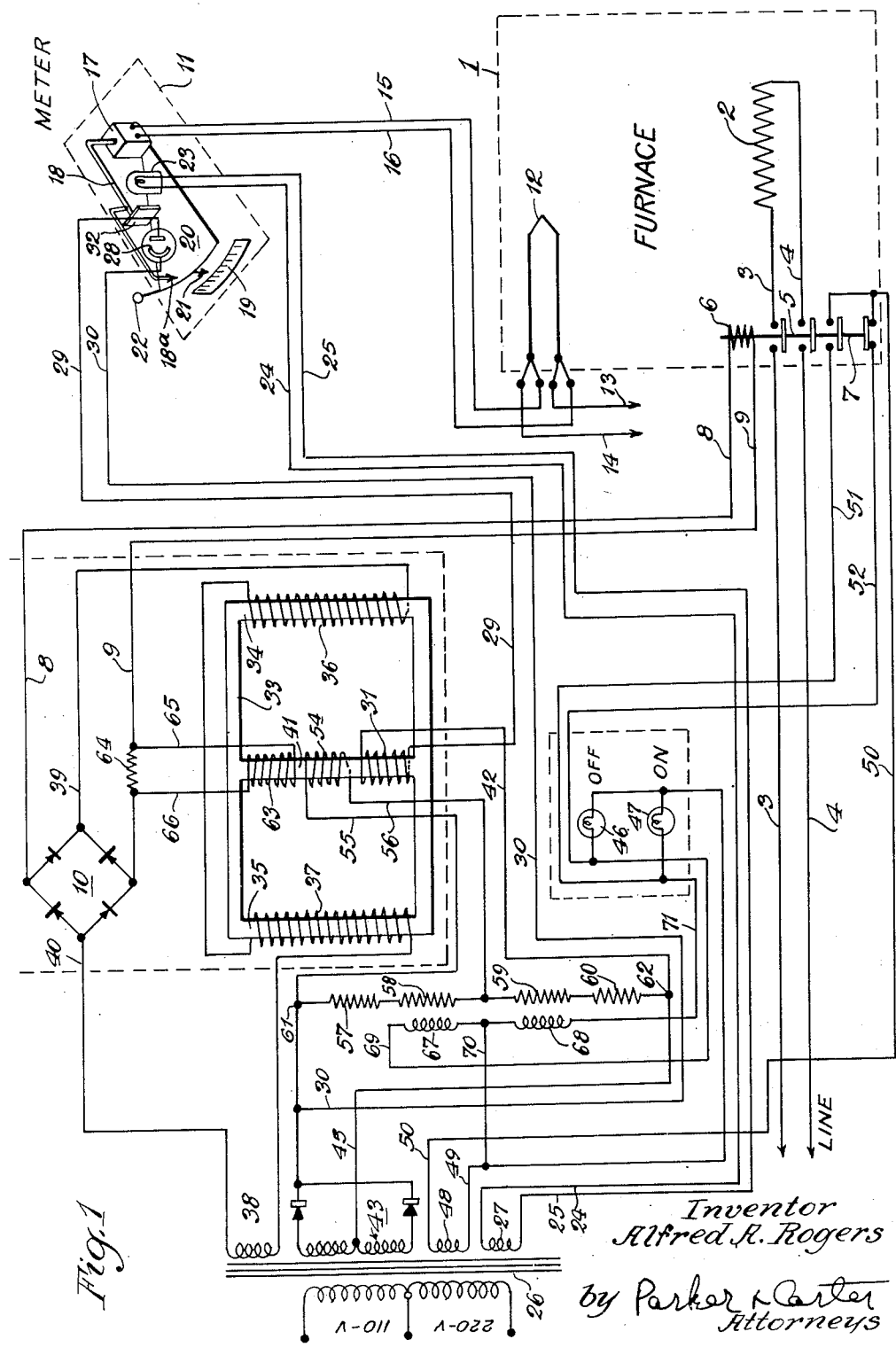
Inventor
Alfred A. Rogers
by Parker & Carter
Attorneys Oct. 22, 1957 A. A. ROGERS 2,810,526
PROPORTIONING ON AND OFF CONTROLLING SYSTEM FOR VARIABLES
Filed Oct. 14, 1952 2 Sheets-Sheet 2
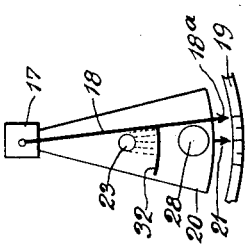
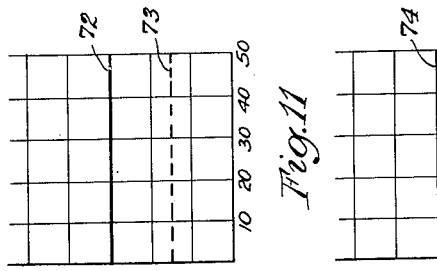
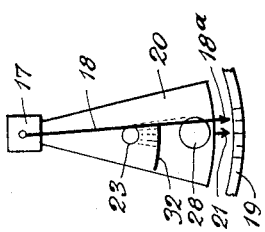
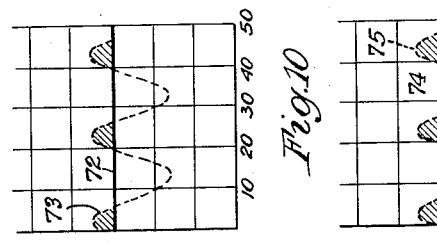
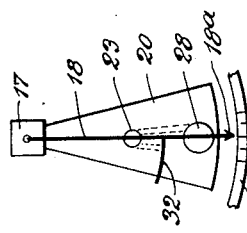
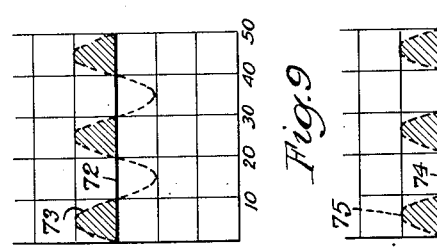
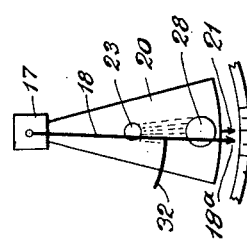
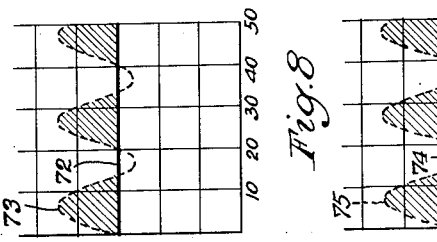
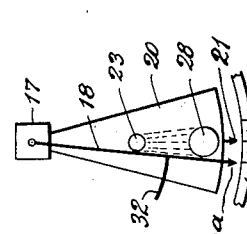
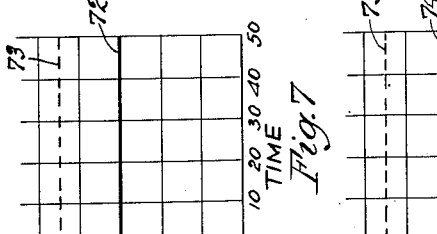
Inventor
Alfred A. Rogers
by Parker + Carter
Attorneys

United States Patent Office 2,810,526
Patented Oct. 22, 1957

2,810,526

PROPORTIONING ON AND OFF CONTROLLING SYSTEM FOR VARIABLES

Alfred A. Rogers, Chicago, Ill., assignor to Industrial Controls, Inc., Chicago, Ill., a corporation of Illinois Application October 14, 1952, Serial No. 314,658

4 Claims. (Cl. 236—69)

This invention relates to the art of control systems for maintaining a variable such as temperature, pressure, speed, torque, vacuum, etc., at a predetermined amount by intermittent actuation of a member adapted, when energized, to deliver energy at a generally constant rate. The invention specifically relates to and is exemplarily usable with furnaces wherein a variable, such as the temperature of the furnace is desired to be maintained for a certain period of time at a predetermined magnitude. Many furnace constructions, for example, are employed in metal heat treating industries, ceramic industries, and the like. When employing a furnace construction in an industry of this type, it is generally desirable to operate the furnace at a predetermined temperature. When a furnace is operated at such a predetermined temperature, some device is usually employed for determining when the desired temperature is reached and some other device or mechanism is employed for turning off the heat supplied to the furnace when the desired temperature is reached. Many of these mechanisms are known as thermostats.

When employing a thermostat, the supply of heating energy is turned off by suitable actuation of a controlling member, when the desired operating temperature is reached, and as long as the furnace temperature or variable is below that of the desired temperature the thermostat may maintain the supply of heat to the furnace. Now a thermal system continues to heat after the element is de-energized for a short period of time and conversely, a thermal system continues to cool for a short time when the heating element is re-energized. This is known as thermal inertia. In the metal heat treating and ceramic industries the quality and uniformity of the product treated is dependent upon strict adherence to the desired furnace temperature. Generally, greater quality and uniformity of the product treated in a furnace are gained where strict adherence to the desired temperature or variable is maintained.

When controlling the magnitude of a variable, such as the temperature of a furnace, by the intermittent actuation of a member adapted to deliver energy at a constant rate, such as a relay energizing a heating element, the inertia of the system produces fluctuations in the magnitude of the variable about the desired magnitude when an "on and off" controller is employed. Furthermore, the magnitude of the variable depends upon the relation of energized or "on" time to the de-energized or "off" time. The magnitude of the fluctuations are dependent in part upon the sensitivity of the system as well as the desired magnitude of the variable. It is accordingly a primary object of my invention to provide a system of variable control wherein the relation of "on time" to "off time" of the member delivering energy is controlled when the actual magnitude of the variable is in the proximity of the desired magnitude so that the system anticipates the desired magnitude of the variable and compensates for the inertia of the system.

Another object of my invention is the provision of a control system for furnaces wherein means are provided for operating a furnace at any desired temperature with a minimum of variation from that desired temperature.

Another object of this invention is to provide novel means for initiating and stopping the operation of a furnace heating element or similar element delivering energy.

A further object of this invention is to combine a magnitude indicating device with a controlling system for energizing and de-energizing an actuating member adapted to control the magnitude of a variable in such a manner that variations from a predetermined desired magnitude are reduced to a minimum.

A still further object of this invention is the provision of a controlling system for variables such as temperature, pressure, etc., wherein ambient temperature effects on the controlling system are reduced to a minimum.

Other objects will appear from time to time in the course of the ensuing specification and claims.

Referring to the drawings:

Figure 1 is a schematic diagram of my controlling system.

Figures 2 through 6 are schematic illustrations of my controlling meter in several operable positions.

Figures 7 through 11 are graphs illustrating comparative magnetic effects in my system.

Figures 12 through 16 are graphs illustrating comparative relay currents in my system.

Referring specifically now to the drawings wherein like elements are indicated by like characters throughout and in the first instance to Figure 1, it will be seen that 1 indicates a furnace of conventional form, shown diagrammatically for purposes of clarity of illustration. The furnace may be heated by any suitable resistance coil or heating element 2, which is energized through any suitable leads 3 and 4 and is adapted to be energized by any suitable relay coil 6. While relay switch member 5 is shown as disposed inside of the furnace, it should be understood that this is for purposes of illustration only. In practice the switch member 5 may be positioned some distance from the furnace or device controlled. It will be apparent that by energizing the relay 6 the heating element 2 will be energized to supply heat to the furnace 1. Operation of relay switch member 5 operates an auxiliary switch member 7 for a purpose which will be pointed out in ensuing portions of this specification.

Relay coil 6 is energized through suitable circuits formed by lines 8 and 9 which are adapted to be connected to the output of the rectifier 10. Rectifier 10 is preferably in the form of a selenium cell rectifier, which is well-known in the art. Since the rectifier in itself forms no part of the present invention, the showing of the rectifier in the drawings is more or less diagrammatic. According to the invention, relay coil 6 operates switch member 5 to complete the circuit to the heating element 2 upon reception of a predetermined amount of current from the rectifier 10. A current on the order of 10 to 20 milliamperes may be employed. When the output of the rectifier is below this predetermined amount of current, the energization of coil 6 is insufficient to actuate switch member 5 and the heating element 2 remains in a de-energized condition. On the other hand, when the output from the rectifier 10 is equal to or greater than this predetermined amount of current, the energization of coil 6 is sufficient to actuate the switch member 5 and maintain the heating coil 2 in an energized condition. It will be apparent that by controlling the output of the rectifier 10, energization of the heating coil 2 may be controlled and, accordingly, the temperature of the furnace may be controlled. In the embodiment shown, a predetermined desired temperature in the furnace is maintained by alternately energizing and de-energizing the heating element 2.

An indicating meter 11 is employed to control the output of the rectifier 10 and accordingly, the energization of the heating coil 2 and the temperature of the furnace 1. The meter 11 includes means for indicating the actual temperature of the furnace and means for establishing a predetermined desired operating temperature of the furnace. The meter is separated from the control circuit. The meter is used for selectively controlling conditions in the control circuit and operation of the meter is independent of electrical conditions in the circuit. The meter is shown more or less diagrammatically in Figure 1 for purposes of clarity.

A thermocouple 12 is disposed in the furnace. Thermocouple 12 has suitable output lines 15 and 16 leading to any suitable mechanism 17 for moving an indicating arm 18 in response to changes in the temperature in the furnace. Since indicating thermocouples of this general nature are well-known in the art, it is not believed necessary to illustrate the thermocouple and indicating arm in detail. Suffice it to say that the thermocouple 12 includes two dissimilar metals which are heated by the furnace. A variation in the temperature adjacent the thermocouple changes the voltage in the output lines of the thermocouple. This change of voltage is reflected in deflection of the indicating arm 18. For every difference of temperature in the furnace 1 a difference in deflection of the indicating arm 18 results. Suitable lines 13 and 14 may lead to any suitable circuit (not shown) for shorting out thermocouple 12 when the thermocouple is broken.

Means are provided for setting the meter for a predetermined operating temperature of the furnace. A calibrated scale 19 provided with any suitable indicia is positioned on the meter. Indicating arm 18 carries a pointer 18a positioned adjacent scale 19 for indicating the actual degree of temperature or magnitude of the variable. Preferably, the indicia represent differences in degrees of temperature or various magnitudes of a variable. A setting arm 20 is pivotally mounted in the meter for movement through an arc generally equal to the arc of the movement of the indicator 19. The setting arm 20 includes an indicating pointer 21, fixed generally centrally of the indicating arm and disposed adjacent scale 19. Suitable means such as handle 22 are provided on the setting arm 20 for moving the setting arm to any desired temperature reading on the indicating device 19. The setting arm 20 is preferably constructed so that it may be readily moved to any desired position with respect to the indicator 19 and remains in that set position. Since such scales and setting arms are generally well known in the art, it is not thought necessary to illustrate them with particularity, and therefore, they are shown in the drawings in a more or less diagrammatic sense. The indicating arm 18 is so constructed that it moves into alignment with a temperature or magnitude reading on the scale 19 for any degree of temperature or magnitude of the variable.

Means are provided for comparing the deflection of the indicating arm 18 with the deflection of the pointer 21. From this it follows that deflection of the indicating arm 18 as compared with the predetermined set deflection of the setting arm 20 may show the relation of the desired temperature or magnitude to actual degree of temperature or magnitude and the furnace controlled accordingly. Obviously, when the deflection of the indicating arm 18 is less than the predetermined set deflection of the setting arm 20, the temperature of the furnace will be below the desired operating temperature and the heating element 2 of the furnace should be maintained in an energized condition. On the other hand, when the deflection of the indicating arm 18 is greater than the predetermined set deflection of the setting arm 20, it will be apparent that the temperature of the furnace is higher than the predetermined desired temperature and the heating element should be de-energized in order to reduce the temperature of the furnace.

Any suitable light source 23 or source of radiant energy is carried on the setting arm 20 and is generally positioned on a line between the pointer 21 and the pivot of the setting arm 20. Light source 23, which may be of any suitable construction, is adapted to be energized through suitable leads 24 and 25 which are suitably connected to any A.-C. power source such as the transformer 26. As shown the light source 23 receives current from a secondary coil 27 of a transformer 26. A photocell 28 or radiant energy receiver is mounted on the setting arm 20 in alignment with the pointer 21 and light source 23 and spaced relatively to the light source 23 with respect to the pivot of the setting arm 20. The photocell 28 may take one of several well known forms. Preferably a lead sulphide cell is employed. Photocell 28 is positioned to receive light or radiant energy from the light source 23. Photocell 28 is in circuit with a source of direct current such as rectifier assembly 43 through lines 42 and 45 and delivers variable direct current through a suitable circuit 29 and 30 to a coil 31 which is adapted to control the output of the rectifier 10 through a reactor 33, and accordingly, the energization of the heating element 2 in a manner which will be fully pointed out in ensuing portions of this specification. The system is so constructed that when the photocell 28 is delivering maximum current to the coil 31 the relay 6 energizes the switch 5 to maintain the heating element 2 energized and conversely, when the photocell is delivering a minimum of current to the coil 31 the relay 6 receives insufficient current to actuate switch member 5 to energize the heating element 2 thus leaving the heating element 2 in a de-energized position.

A flag or light obstructing member 32 is mounted on the indicating arm 18 and is positioned so that it may pass between a line between the photocell 28 and the light source 23 and thus interrupt the passage of light to the photocell 28. It will be apparent that as the deflection of the indicating arm 18 approaches the deflection of the setting arm 20, the light reaching the photocell will be gradually eclipsed by the flag 32 resulting in a gradually diminishing current delivered to the coil 31. It will be apparent then, that the gradual eclipse of the light existing between the light source 23 and photocell 28 will result in a reduction of current in the output of the rectifier 10 to a point which is below the predetermined amount of current necessary to actuate the switch member 5 to energize the heating element 2. As long as the deflection of the indicating arm 18 is below the predetermined degree of deflection of the setting arm 20, a maximum current to the relay coil will result, thereby maintaining the heating element in an energized condition. However, when the deflection of the indicating arm 18 is far greater than the predetermined set deflection of the arm 20 the current to the relay 6 will be less than that amount of current necessary to actuate the switch 5 and the heating element 2 will be de-energized. From the foregoing, it will be apparent that as long as the indicated degree of temperature or magnitude is below the predetermined desired degree of temperature, the heating element will be energized and when the indicated temperature of the furnace 1 is above the predetermined set temperature the heating element will be deenergized.

Means are provided for amplifying the direct current received from the photocell 28 so that when the photocell 28 is passing a maximum amount of direct current sufficient current will be passed to the relay 6 to actuate the switch member 5 and energize heating element 2. The amplification system in this instance is comprised of a three-legged saturable reactor 33, the rectifier 10 and the power transformer 26. The outside legs 34 and 35 of the reactor carry windings 36 and 37 connected in circuit with a transformer coil 38 and the input of the rectifier 10 through suitable lines 39 and 40. The windings 36 and 37 are wound series opposing so that a minimum of induced voltage exists in the inner or center leg of the reactor. In a saturable reactor of this type the reactive impedance of the coils on the outside legs 34 and 35 of the reactor effectively reduces the ability of these coils to pass current due to the permeability of the core of the reactor. If the center leg 41 of the reactor is magnetized by direct current the effective permeability of the core is reduced, resulting in a reduction in reactive impedance in the outside windings 36 and 37 and accordingly a larger amount of current may be passed to the input of the rectifier 10. By increasing the direct current magnetization of the center leg 41 of the reactor, the current to the rectifier 10 may be increased and conversely, by decreasing the direct current magnetization of the center leg of the reactor 33, the current to the rectifier may be decreased. Increasing or decreasing the amount of alternating current supplied to the rectifier 10 proportionately increases or decreases the amount of current supplied from the output of the rectifier to the relay coil 6.

The photocell coil 31 is disposed around the center leg of the reactor. It will be apparent, then, that deflection of the indicating arm 18, as compared to the set deflection of the arm 20 and photocell may control the input of the rectifier and the energization of switch member 5.

A pair of indicating pilot lights 46 and 47 are employed to indicate whether the heating element 2 is in the energized condition or de-energized condition. Pilot lights 46 and 47 are energized by means of any suitable secondary coil 48 receiving current from transformer 26 through suitable lines 49 and 50. As shown in Figure 1 a switching member 7 alternatively establishes the circuit through pilot light 46 or pilot light 47. The switching member 7 is so arranged that when relay 6 is energized to close switch member 5, the circuit through pilot light 47 is completed, which is in this example the "on" indicating light. When relay 6 is de-energized and the heating element 2 is accordingly de-energized the switching member 7 opens the circuit to the pilot light 47 and closes the circuit to pilot light 46 which is the "off" indicating light. As shown, the pilot lights 46 and 47 are connected in parallel with the line 49 and the line 50. Line 50 establishes the circuit alternatively through line 51 when switch member 5 is in the energized position or line 52 when the switch member 5 is in the de-energized or "off" position. I wish it to be understood that the showing of the switching member 7 in this manner is diagrammatic and only for purposes of illustration. Many equivalent means of operating the pilot lights 46 and 47 may be employed with equal facility.

According to the invention, the heating element 2 is alternatively turned on and off for equal periods of time when the actual degree of temperature or magnitude is at the predetermined desired temperature or magnitude indicated by the setting arm 20. When the temperature is slightly above the desired temperature, the increment of time which the heating element is "off" or de-energized is increased with relation to the increment of time during which the heating element is "on" or energized. Conversely, when the furnace temperature is slightly below the desired furnace temperature, the increment of time during which the furnace is "on" is increased with relation to the increment of time during which the furnace is "off." It will be apparent that if the furnace temperature is above the predetermined desired temperature, a greater amount of "off" or de-energizing time of the heating element 2 will result in a gradual cooling of the furnace or diminution of the degree of temperature or magnitude. If the furnace temperature is below the predetermined desired temperature, an increase in the heating time or "on" time of the heating element 2 with relation to the "off" or cooling time of the heating element 2 will result in a gradual buildup of heat or increase in the degree of temperature or magnitude. When the indicated temperature equals the predetermined desired temperature, the amount of "on" or energized time is maintained equal to the "off" or de-energized time.

A controlling range of temperatures or magnitudes is established for this proportioning action. The controlled range may, for example, extend through a range of temperatures from several degrees less than the predetermined desired temperature to several degrees greater than the predetermined desired temperature. Outside of this controlling range, no proportioning action is effected. That is to say, when the indicated degree of temperature or magnitude is below the controlled range, the furnace heating element is maintained in an energized or heating condition. On the other hand, when the indicated furnace temperature is greater than the controlled range of temperature, the heating element is maintained in a de-energized condition so that the furnace is kept in a cooling condition. However, when the indicated temperature is between the upper and lower limits of temperatures in the controlled range of temperatures, the proportioning action is effected. A control point is established at the midpoint of the controlled range of temperatures or magnitudes. At the control point the indicated temperature is equal to the predetermined desired temperature and the amount of cooling time of the furnace equals the amount of heating time of the furnace. In this manner the magnitude of the variable, the furnace temperature in this instance, is maintained within very close limits.

The controlled range of magnitudes is defined in the instrument by the degrees of deflection of the indicating arm 18 with relation to the position of the setting arm 20. The lower limit of the controlled range is generally at that temperature or point where the flag 32 on the indicating arm 18 begins to eclipse some of the light from the light source 23 to the photocell 28. The maximum or upper limit of the controlled range is generally at that point or degree of temperature where the light from the light source is totally eclipsed. Since the amount of light striking the photocell 28 varies the current to the winding 31, it will be apparent that a maximum amount of current is received by the winding 31 below the lower limit of the controlled range of temperatures and a minimum amount of current will be received by winding 31 when the photocell 28 receives no light from the light source 23. The direct current to the coil 31 varies in proportion to the amount of light striking the photocell 28 or in inverse proportion to the deflection of the temperature indicating arm 18.

In order to effect the alternative energization and de-energization of the relay switch 5, means are provided for opposing the magnetization effect produced by winding 31.

A bias winding 54 is wound about the center legs 41 of the saturable reactor and the turns of the winding are disposed in such a manner that the direct current magnetization of the reactor core by this winding 54 opposes the direct current magnetization of the center leg 41 of the saturable reactor 33 provided by the winding 31. Winding 54 is connected in parallel through suitable lines 55 and 56 with a fixed resistor 57, and a negative temperature co-efficient resistor 58. A fixed resistor 60 and negative temperature coefficient resistor 59 are connected in series with this circuit. The bias coil circuit thus established is connected to the output of the rectifier assembly 43 as at 61 and 62. In the bias winding circuit thus established it will be apparent that if the resistance of the resistor 59 is decreased, the current through resistor 59 will increase and the current through the bias winding 54 will be decreased. The resistors 57 and 60 respectively tend to compensate for or "pad" the action of the resistors 58 and 59 respectively, since the resistors 58 and 59 are highly sensitive.

A feed back coil 63 may be connected in circuit with relay coil 6 and is disposed on center leg 41 of reactor 33. The feed back coil 63 is disposed so as to create flux in the center leg in the same direction as that created by coil 31, thus amplifying the effect of coil 31. A shunt 64 may be provided across the leads 65, 66 of coil 63 to selectively vary the action of feed back coil 63 when desired.

The magnetization effect produced by the bias winding 54 opposes the magnetization effect produced by the feed back winding and the photocell winding. The currents in these windings are adjusted so that when the magnetization effect produced by each winding is at a maximum, the net magnetization is sufficient to cause a current to flow to the relay coil 6 which is equal to or greater than that necessary to operate switch member 5. Thus, when the indicating arm 18 is below the minimum magnitude in the controlled range, the relay switch member 5 will be held in an energized position. On the other hand, when the indicating arm 18 is at a magnitude greater than the maximum limit of the controlled range of magnitudes, the magnetization effect produced by the photocell winding is at a minimum and the net magnetization of the core of the reactor 33 is less than that required to produce the predetermined amount of current necessary to operate switch member 5 and, accordingly, the switch member 5 is held in a de-energized position. When the indicating arm 18 is at a position equal to one of the magnitudes in the controlled range, the magnetization effect of the photocell winding 31 is less than its maximum value. The magnetization produced by the bias winding 54 then fluctuates between an amount producing a net magnetization insufficient to cause energization of relay switch member 5 and an amount sufficient to cause energization of the relay switch member 5. It will be apparent that as the magnetization produced by photocell winding 31 is gradually diminished, a relatively smaller amount of magnetization produced by the bias winding 54 will be required to produce a net magnetization of an amount small enough to cause de-energization of the relay switch member 5.

The strength of the current received by the coil 31 varies with the movement of the indicating arm 18, or the indicated degree of temperature or magnitude. The strength of the bias winding 54 varies with the resistance of the resistors 58 and 59. Increasing the effective value of the bias winding 54 will have the same effect as decreasing the effective value of the photocell winding 31. Similarly, decreasing the effective value of the winding 54 will have the same effect as increasing the effective value of the photocell winding 31. In like manner, increasing the effective value of the winding 31 will result in decreasing the effective value of the winding 54 and decreasing the effective value of the winding 31 will have the same result as increasing the effective value of the winding 54.

A heating element 67 is disposed adjacent the resistor 58 and a heating element 68 is disposed adjacent the resistor 59. Heating element 67 is adapted to heat the resistor 58 and allow an increase of current through the resistor resulting in a decrease of current to the bias winding 54. In actual practice, the heating elements 67 and 68 may be formed by wrapping the turns of the heating coils of elements around the resistors 58 and 59. Heating element 68 is adapted to heat the resistor 59 and accordingly increase the current through the resistor 59 which results in an increase of current through the bias winding 54. Heating element 67 is connected in circuit with indicator pilot light 46 as by any suitable lines 69 and 70. Heating element 68 is connected in circuit with pilot light 47 as by any suitable lines 70 and 71. Therefore, when the heating element 2 is energized heating element 68 will be heating the resistor 59 and increasing the current through the bias winding 54. On the other hand, when the heating element 2 is de-energized, the heating element 67 will be decreasing the resistance of resistor 58, increasing the current through resistor 58 and decreasing the current through the bias winding 54. It follows that the bias winding 54 is increasing its magnetization effect on center leg 41 when the relay switch 5 is energized and decreasing its magnetization effect when relay switch 5 is de-energized. Further, the arrangement is such that the action of the bias winding causes a gradual buildup of current to relay coil 6 when the switch 5 is de-energized and causes a gradual diminution of current to the relay coil 6 when the switch 5 is energized. While the heating elements 67 and 68 are shown as being in circuit with the pilot lights 46 and 47, any equivalent circuit may be employed for increasing the effect of bias winding 54 when the switch member 5 is energized and decreasing the effect of bias winding 54 when the switch member 5 is de-energized. For example, while negative temperature coefficient resistors are shown, any resistors having the property of producing a rapid change in resistance in response to heat may be employed. In case positive temperature coefficient resistors are employed, heating element 67 would be utilized to heat the resistor in parallel with bias winding 54 when the switch 5 is energized and heating element 68 would be utilized to heat the other resistor when the switch 5 is de-energized. Essentially, the system includes a circuit responsive to de-energization and energization of the switch member 5 for decreasing and increasing the current to bias winding 54.

Thus the alternative increase and decrease of the current in bias winding 54 produces variations in the net magnetization of the core reactor 33 between an upper limit greater than that required to cause energization of switch 5 and a lower limit less than that required to cause such energization. At the control point position, the current to bias winding 54 is slightly greater than that amount necessary to reduce the net magnetization to a point below that required to cause energization of switch 5, if the resistors 58 and 59 are neglected. However, the resistors produce fluctuations in this magnetization from a point above to a point below the necessary magnetization, causing alternative energization and de-energization of switch 5. In actual practice the switch 5 may be energized and de-energized for about ten seconds at the control point position.

According to the invention the proportion of "on" or energized time of the heating element 2 is varied with relation to the "off" or de-energized time of the heating element 2 throughout the range of controlled degrees of temperatures or magnitudes. The deflection of the indicating arm 18 controls the amount of current through the winding 31 in this controlled range, and accordingly proportions the amount of "off" time to "on" time of the heating element 2. If, for example, the indicating arm 18 is moved through approximately 25% of the controlled range, the current to the winding 31 will be greater than the current to the winding 31 when the deflecting arm 18 is at the control point position. This means that the strength of magnetization of the winding 31 is greater with relation to the strength of winding 54 than at the control point position. In order for the bias winding 54 to overcome the effect of winding 31 in this example, the current to the winding 54 must be built up to a greater extent than that necessary at the control point position. Heating element 68 must be left on for a longer period of time to reduce the resistance of resistor 59 sufficiently to allow a large enough current to pass through resistor 59 and accordingly winding 54 to overcome the effect of the winding 31 and reduce the net magnetization. Further, heating element 67 must be energized for a relatively shorter period of time to reduce the resistance of the resistor 58 and allow more current to pass through resistor 58 and reduce the current through the bias winding 54 to increase the net magnetization.

In like manner, when the indicating arm 18 has moved through approximately 75% of the controlled range of temperatures the effective value of the current in the winding 31 will be considerably less than that at the control point position. Therefore, heating element 67 must be left on for a relatively greater period of time to reduce the value of the bias winding sufficiently to increase the net magnetization and the amount of time required for the heating element 68 will be relatively less in order to increase the current through the bias winding sufficiently to allow the bias winding 54 to reduce the net magnetization and de-energize the relay switch 5. The relation of the indicating arm 18 to the control point position fixes the proportion of "off" time and "on" time of the switch 5. The variance in this proportion thus compensates for the inertia of the system and anticipates the control point position or predetermined desired magnitude.

In Figures 2, 3, 4, 5, and 6, diagrammatic illustrations of the movement of the indicating arm 18 through the controlled temperature range are shown. In Figure 2, for example, the indicating arm 18 is just beginning to enter the controlled range of temperatures which are on the order of, in this instance, approximately 5°. At this point the flag 32 on the indicating arm 18 is not interfering with light from the light source 23 to the photocell 28 and maximum light strikes the photocell. In Fig. 3, the indicating arm 18 has moved through approximately 25% of the controlled range of temperatures and the photocell 28 is receiving approximately 25% less light from the light source 23 by virtue of the partial eclipse produced by the flag 32. In Figure 4, the indicating arm 18 has moved through approximately 50% of the controlled range of temperatures and the photocell is receiving approximately 50% less light from the light source 23 by virtue of the partial eclipse produced by the flag 32. This is the control point position. In Figure 5, the indicating arm 18 has moved through approximately 75% of the controlled range of temperatures and the photocell 28 is receiving approximately 75% less light due to the partial eclipse produced by the flag 32. In Figure 6, the indicating arm 18 has moved through 100% of the controlling range of temperatures and the photocell 28 is receiving no light from the light source 23 due to the total eclipse produced by the flag 32.

Figures 7, 8, 9, 10 and 11 are graphic illustrations of a comparison of the net magnetization produced in the reactor and the magnetization required to cause energization of the relay with the magnetization being plotted on one coordinate and increments of time being plotted on the other. Figures 7, 8, 9, 10 and 11 correspond to Figures 2, 3, 4, 5 and 6 respectively in so far as the position of the deflecting arm with relation to the controlled range of temperatures is concerned. In Figures 7, 8, 9, 10 and 11 the net magnetization required to cause energization is shown in full line. The net magnetization produced is shown in dotted line.

In Figure 7 magnetization caused by the photocell winding 31 as indicated by line 73 is at a maximum and the net magnetization is greater than that magnetization required to produce or cause energization of the relay switch 5 as indicated by line 72. In Figure 8 magnetization caused by the photocell winding 31 is approximately three fourths of the magnetization produced in Figure 7 due to the fact that the flag 32 has eclipsed a portion of the light striking the photocell. The bias winding magnetization is fluctuating due to the alternative energization of the heating elements 67 and 68 producing fluctuations in the net magnetization. As will be apparent in Figure 8, the net magnetization is greater than that required to cause energization of the relay switch for approximately 75% of the time. In Figure 9 the magnetization produced by the photocell winding 31 is approximately one-half of that produced in Figure 7 since the flag 32 has eclipsed approximately 50% of the light reaching the photocell 28. The net magnetization is greater than that required to cause energization of the relay switch 5 for approximately 50% of the time. In Figure 10 the flag 32 has eclipsed approximately 75% of the light striking the photocell and since the magnetization produced by the bias winding 54 is fluctuating, the net magnetization is also fluctuating and is greater than that required to cause energization of the relay switch 5 for approximately 25% of the time. In Figure 11 the flag 32 has eclipsed all of the light striking the photocell resulting in minimum magnetization produced by the photocell winding 31. At this position of the indicating arm, the net magnetization produced in the reactor is never sufficient to cause energization of the relay switch 5. In Figures 7 through 11, inclusive, the shaded portions indicate those times during which the relay switch 5 will be energized.

Figures 12, 13, 14, 15 and 16 are graphic illustrations of the current actually passing to the relay 6 and the current necessary to operate the relay coil 6 plotted against time. Figures 12, 13, 14, 15 and 16 correspond to Figures 2 and 7, 3 and 8, 4 and 9, and 5 and 10, and 6 and 11 respectively. 74 represents the amount of current necessary to operate the relay switch member 5. 75 indicates the current received by the relay coil 6 from the rectifier 10. In Figure 12 the current received by the relay coil 6 is greater than the amount of current necessary to operate the relay switch member 5 resulting in a maintenance of the relay switch member 5 in an energized condition. In Figure 13 the current received by the relay as indicated by the line 75 is fluctuating due to the fluctuation of the net magnetization 73 as indicated in Figure 8. Those points on the relay current curve which are above or greater than the curve 74 indicate time during which the relay coil energizes switch member 5. As will be apparent from Figure 13, switch member 5 is energized for approximately 75% of the time and de-energized for approximately 25% of the time. In Figure 14, the current received by the relay as indicated by the curve 75 is fluctuating due to the fluctuations in the bias coil current. It will be apparent that the relay switch member 5 is energized for approximately 50% of the time and de-energized for approximately 50% of the time. In Figure 15 the relay current as indicated by curve 75 is fluctuating. It is below the predetermined necessary current as indicated by line 74 for the greater portion of the time or approximately 75% of the time, resulting in de-energization of the relay switch member for approximately 75% of the time and energization of the switch member for approximately 25% of the time. In Figure 16 the current received by the relay coil 6 as indicated by the line 75 is always less than the current necessary to operate the relay switch as indicated by line 74, due to the total eclipse of light by the flag 32.

It should be understood that the graphic positions of the lines 73 and 75 in Figures 7 through 16, inclusive, should not be taken as indicating any particular value of net magnetization and relay current. The graphic illustrations are intended merely to illustrate the general relation of "on" time and "off" time to the magnetization produced by the photocell 28 and bias winding 54 and to the relay current produced in the system.

The controlling system herein shown and described may be conveniently utilized in a system wherein something other than temperature of a furnace is desired to be controlled. For example, the system is capable of application in any situation where it is desired to control the magnitude of a variable, such as pressure. In such an application, for example, a pressure indicating device would be substituted instead of the thermocouple 12 with the indicating device being utilized to deflect the indicating arm 18. The relay coil 6 may be employed to govern the operation of an electrically operated pump, pumping any suitable fluid to the space or to control a valve. In such an instance the movement of the indicating arm 18 would be utilized to proportion the amount of "on" time and "off" time of the pump or valve thereby maintaining the pressure at any predetermined amount within the space.

The arrangement of the resistors 58 and 59 is such that ambient temperature effects on the system are held to a minimum. That is to say any variation in the temperature adjacent the controlling system will effect the resistors 58 and 59 in equal amount so that such temperature effects on the resistors balance out.

While the increments of energized time and de-energized time have been shown to be about equal when the indicated magnitude is equal to the predetermined desired magnitude, I wish it to be understood that this showing is exemplary only of an application where the predetermined desired magnitude is maintained by equal increments of energized time and de-energized time. In any application where the desired magnitude is maintained by a different proportion of energized time to de-energized time, the system will maintain the correct proportion, since where a different proportion is required, the indicating pointer will tend to move away from the control point position and effect the correct proportion.

While it will be realized that I have shown and illustrated an operative device, I wish it to be understood that the embodiment shown and described herein is for purposes of illustration only and that many modifications within the spirit of the invention are possible and that the scope of the invention should be limited only as by the scope of the hereinafter appended claims. For example, a wide variety of ranges of currents produced by the photocell and bias circuit may be employed so long as the range of current produced by the photocell, as compared to the range of current produced in the bias winding circuit, produces a fluctuating net magnetization effect in the reactor in the manner herein described. If desired, a suitable rheostat or resistance may be included in the bias circuit for adjusting the range of current in the circuit to produce the effect desired.

I claim:

1. A control system for maintaining a variable at a desired value in which apparatus affecting the variable is switched on or off by an electrical relay including a saturable reactor for energizing an on and off relay, said reactor having two opposed control windings, an indicating meter for indicating the magnitude of the variable being controlled, said meter having an output for energizing one of said control windings, means for changing the output of the indicating meter from maximum to minimum as the actual value of the variable passes through a given control range including the desired value, said second control winding being energized by a circuit having a variable output, means for progressively raising and lowering the output from said last named circuit when the relay is alternately switched on and off, said output for said second control winding being periodically sufficient to overcome the effect of said first named winding when the value of the variable is in the control range whereby the combined effect of said two windings is such as to alternately energize and de-energize said relay with varying periods of energized time and de-energized time in consonance with the relation of the output from the meter to its maximum output when the value of the variable is in said control range.

2. The structure of claim 1 wherein the current in said first named winding is controlled by the amount of light reaching a photocell, and the amount of light reaching said photocell is variably controlled by selective positioning of the photocell and by movement of a variable responsive member into eclipsing position with respect to a light source delivering light to said photocell.

3. The structure of claim 1 wherein said means for controlling the current in said second named winding includes a voltage divider circuit adapted to selectively increase and selectively decrease the current in said second named winding in response to energization and deenergization of said relay.

4. The structure of claim 3, wherein said voltage divider circuit includes resistors and heaters for said resistors, said heaters being selectively energized and de-energized in response to energization and deenergization of said relay.

References Cited in the file of this patent

UNITED STATES PATENTS

| Number | Name | Date |
|---|---|---|
| 1,150,953 | Moskowitz | Aug. 24, 1915 |
| 1,482,791 | Hafer | Feb. 5, 1924 |
| 1,541,600 | Steenstrup | June 9, 1925 |
| 1,745,915 | Schlenker | Feb. 4, 1930 |
| 1,834,416 | Osgood | Dec. 1, 1931 |
| 1,976,854 | Mayer | Oct. 16, 1934 |
| 2,012,588 | Logan | Aug. 27, 1935 |
| 2,082,607 | Amsden | June 1, 1937 |
| 2,085,855 | Hunt | July 6, 1937 |
| 2,086,120 | Croden | July 6, 1937 |
| 2,138,593 | Breitenstein | Nov. 29, 1938 |
| 2,148,491 | Moore | Feb. 28, 1939 |
| 2,218,464 | Fairchild | Oct. 15, 1940 |
| 2,220,028 | Smith | Oct. 29, 1940 |
| 2,276,822 | Bowman | Mar. 17, 1942 |
| 2,285,204 | Hall et al. | June 2, 1942 |
| 2,470,556 | Hedstrom et al. | May 17, 1949 |
| 2,595,644 | Davis | May 6, 1952 |
| 2,617,089 | Davis | Nov. 4, 1952 |
| 2,706,764 | Mitchell | Apr. 19, 1955 |

FOREIGN PATENTS

| Number | Country | Date |
|---|---|---|
| 372,007 | Great Britain | May 5, 1932 |